United States Patent
Horrom et al.

[15] 3,640,699
[45] Feb. 8, 1972

[54] 3,5-DISUBSTITUTED BENZAMIDES

[72] Inventors: Bruce W. Horrom, Waukegan; Aldo J. Crovetti, Lake Forest, both of Ill.; Kenneth L. Viste, Warminster, Pa.

[73] Assignee: Rohm and Haas Company, Philadelphia, Pa.

[22] Filed: Mar. 3, 1970

[21] Appl. No.: 16,249

Related U.S. Application Data

[60] Division of Ser. No. 671,946, Oct. 2, 1967, Pat. No. 3,534,098, Continuation-in-part of Ser. No. 608,271, Jan. 10, 1967, abandoned.

[52] U.S. Cl. .................................71/118, 71/79, 260/544 M
[51] Int. Cl. ...........................................................A01n 9/20
[58] Field of Search....................................71/118; 260/558

[56] References Cited

UNITED STATES PATENTS

| | | | |
|---|---|---|---|
| 3,436,208 | 4/1969 | Lemin | 71/118 |
| 3,357,816 | 12/1967 | Barier et al. | 71/118 |
| 2,412,510 | 12/1946 | Jones | 71/118 |

*Primary Examiner*—Lewis Gotts
*Assistant Examiner*—Catherine L. Mills
*Attorney*—George W. F. Simmons, Carl A. Castellan and Arthur R. Eglington

[57] ABSTRACT

Herbicidal compositions containing as the active ingredient a member of the class of N-(1,1-dimethylpropynyl)-3,5-disubstituted benzamides and a method for controlling undesirable plant growth with them.

11 Claims, No Drawings

3,5-DISUBSTITUTED BENZAMIDES

This application is a divisional of U.S. Ser. No. 671,946 filed Oct. 2, 1967 now U.S. Pat. No. 3,534,098 which in turn is a continuation-in-part of U.S. Ser. No. 608,271 filed Jan. 10, 1967 now abandoned.

This invention is directed to new and useful organic chemical compounds and the use of these compounds as herbicides. The invention also embodies various herbicidal formulations and the employment of these herbicidal formulations in the control of undesirable plant growth.

The novel compounds of this invention are N-(1,1-dimethylpropynyl)-3,5-disubstituted-benzamides and may be represented structurally by the following formula:

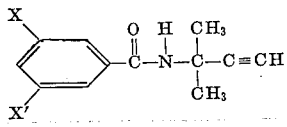

wherein X and X' are selected from Br, Cl, F and $CH_3$. These compounds have been found to exhibit outstanding herbicidal activity and are particularly effective as selective preemergence herbicides. They also are quite effective in killing established grassy weeds. The benzamides may be applied to the environment in which control of plant growth is desired by utilizing them in a solution, dispersion or as mixtures with a solid carrier. For preemergence weed control, the herbicidal formulation may be applied to the surface of the soil or incorporated into the soil.

It has long been desired to discover chemical compounds that will prevent, control or destroy undesirable plant growth such as weeds in areas in which desirable vegetation such as food crops are to be grown or are growing. Use of chemical means for regulating undesired growth is usually preferable to the time consuming and less permanent mechanical means such as tilling and mowing. Chemical agents for destroying undesired vegetation are called herbicides. These may be selective or nonselective. A selective herbicide destroys or stunts particular plants with little or no injury to others whereas a nonselective herbicide is toxic to a broad spectrum of plant life. Herbicides may be further classified, based on the time of application, as preemergence and postemergence. A preemergence herbicide is one applied prior to the appearance of a crop or weed, whereas a postemergence herbicide is applied subsequent to the appearance of a crop or weed. Of course a selective herbicide that will destroy the undesirable plant growth associated with the crop, but will not injure the crop itself, is preferred.

Aromatic benzamides of the following formula are known and described in U.S. Pat. No. 3,133,963 issued May 19, 1964:

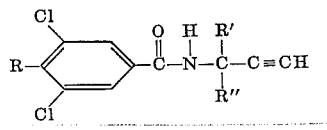

wherein R is methoxy or amino, and

R' and R" are lower alkyls. However, compounds within the scope of the above generic formula were tested for herbicidal activity, but these compounds exhibited essentially no activity as preemergence or postemergence herbicides in preventing growth of both monocotyldeonous (monocots) and dicotyledonous (dicots) weeds.

The novel compounds of this invention are prepared by the amidation of the acid or acid derivative and the appropriate amine. More specifically a 3,5-disubstituted benzoyl chloride is reacted with 3-amino-3-methylbutyne. The 3,5-disubstituted benzoic acids used as starting materials in the preparation of compounds of this invention are all known in the literature, except 3-chloro-5-fluorobenzoic acid. The acetylenic amine may be prepared by the method of G. F. Hennion and Eugene G. Teach, described in the Journal of the American Chemical Society, 75, 1653–4 (1953). (See Compound I of Table I in this reference.)

In general the benzamides of this invention are effective in the control of various grassy and broadleaf weeds and are particularly effective in controlling wild oats (*Avena fatua*), Johnsongrass (*Sorghum halepense*), ryegrass (*Lolium spp.*), crabgrass (*Digitaria spp.*), barnyardgrass (*Echinochloa crusgalli*), lambsquarter (*Chenopodium spp.*), dock (*Rumex spp.*), wild carrot (*Daucus carota*), and velvetleaf (*Abutilon theophrasti*). Crops which have been demonstrated to have tolerance to the herbicidal benzamides of this invention include alfalfa (*Medicago sativa*), corn (*Zea maize*), cotton (*Gossypium hirsutum*), cowpeas (*Vigna sinensis*), peanuts (*Arachis hypogaea*), peas (*Pisum arvense*), rice (*Oryza sativa*), safflower (*Carthamus tinctorius*) and soybeans (*Glycine max*).

The compositions of the invention comprise an N-(1,1-dimethylpropynyl)-3,5-disubstituted benzamide together with an agronomically acceptable carrier. By an agronomically acceptable carrier is meant any substance which can be used to dissolve, disperse, or diffuse the chemical within it, without impairing the effectiveness of the toxic agent, which is not permanently deleterious to the soil in any chemical or physical manner and which is usually nonphytocidal to the agricultural crops to be protected. The compositions may be in the form of solutions, emulsifiable concentrates, wettable powders, granules, or dusts. One or more liquid or solid carriers may be used for a particular herbicidal composition.

An emulsifiable concentrate is made by dissolving an N-(1,1-dimethylpropynyl)-3,5-disubstituted-benzamide in a solvent to which one or more surfactants are added. Suitable solvents or liquid carriers for use in preparing these emulsifiable concentrates may, for example, be found in the hydrocarbon and ketone classes or organic solvents such as xylene, acetone, isophorone, mesityl oxide, cyclohexanone and mixtures of these. Preferred solvents are ketone-hydrocarbon mixtures such as isophorone-xylene. The emulsifying agents used are surfactants of the anionic, cationic, or nonionic types and mixtures thereof. Representative of the anionic surfactants are fatty alcohol sodium sulfates, calcium alkylbenzenesulfonates and sodium dialkyl sulfosuccinates. Representative of the cationics are (higher alkyl) dimethylbenzylammonium chlorides. Representative of the nonionics are condensation products of alkylene oxides with fatty alcohols, alkyl phenols, mercaptans, amines or fatty acids, such as dinonylphenoxypolyethoxyethanol in which there are eight to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are used.

| | Parts/100 Parts Total |
|---|---|
| N-(1,1-dimethylpropynyl)-3,5-disubstituted-benzamide | 10 to 35 |
| Solvent | 55 to 88 |
| Emulsifying agent | 2 to 10 |

Wettable powder formulations comprise an N-(1,1-dimethylpropynyl)-3,5-disubstituted-benzamide admixed in a solid carrier along with a surface active agent(s) which gives this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flower or tobacco dust, and suitable inorganic ones are clays of the montmorillonite (bentonite), kaolinite or fuller's earth types; silicas such as diatomaceous earth and hydrated silica; silicates such as talc, pyrophyllite, or alkaline earth silicates; and calcium and magnesium carbonates. A surfactant or mixture of surfactants is added to the wettable powder formulation. Suitable dispersing agents are sodium lignin sulfonate, sodium formaldehyde-naphthalene sulfonate, or sodium N-methyl-N-higher alkyl taurates. Wetting agents useful for this purpose include higher alkylaryl sulfonates such as calcium dodecylbenzenesulfonate, long-chained alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are eight to 80 ether groupings and similar polyethoxy compounds made from stearyl alcohol. Operative spreading or adhesive agents include glycerol mannitan laurate or a condensate of polyglycerol and oleic acid modified with phthalic anhydride. Additionally many of the surfactants discussed above function as spreading and adhesive agents. The active ingredient content of the wettable powders may be in the range of about 20 to 80 percent; however, the preferred range of concentration is 50 to 75 percent.

The following compositions are typical for wettable powder formulations:

|  | Parts/100 Parts Total |
|---|---|
| N-(1,1-dimethylpropynyl)-3,5 -disubstituted-benzamide | 20 to 80 |
| Carrier | 10 to 79 |
| Surfactants | 1 to 10 |

Dust concentrates are made by incorporating an N-(1,1-dimethylpropynyl)-3,5-disubstituted benzamide of this invention into a solid carrier such as finely powdered clays, talc, silica and synthetic silicates, alkaline earth carbonates and diluents of natural origin, such as tobacco dust or walnut shell flour. Granular formulations are made from similar type solid carriers except that the particle size is larger, in the range of 15 to 60 mesh. A small amount of dispersing agent may be incorporated into these solid formulations. The concentration of active ingredients in these dust or granular formulations may be in the range of 2 to 15 percent.

It will be seen from the above that the compositions of this invention may contain 20 to 98 percent of carrier based on the total weight of the composition, depending on whether it is in the form of a solution, an emulsifiable concentrate, a wettable powder, a dust or a granular formulation.

A particularly convenient method for making solid formulations is to dissolve the active ingredient in a volatile solvent, such as acetone, apply this solution to the solid carrier with thorough mixing, and then remove the solvent by allowing it to evaporate at either normal or reduced pressure.

In preparing the N-(1,1-dimethylpropynyl)-3,5-disubstituted benzamides of this invention, equal molar ratios of the acid or acid derivative and amine reactants are preferred although a molar excess of amine up to 1:2.5 may be employed. When the acyl halide is used, an acid acceptor such as a tertiary amine, an alkali metal hydroxide and an alkaline earth oxide, hydroxide or carbonate is preferred. Representative acid acceptors are sodium hydroxide, calcium carbonate, pyridine, triethylamine, benzyldimethylamine and magnesium oxide. Although not required, an inert organic solvent of the hydrocarbon, halogenated hydrocarbon, ketone or ether classes of solvents is desirable. Suitable solvents are toluene, ethylene dichloride, octane, methyl isobutyl ketone and commercial hydrocarbon mixtures boiling in the range of 90° to 125° C. The amidation reaction may be accomplished in the range of 0° to 50° C. with 10° to 20° C. being preferred. The time of reaction is not critical, but it is usually completed within 1 to 3 hours. While the preferred method of amidation is to employ the acyl halide, the acid and acid derivatives such as the alkyl ester gave suitable results. If the acid is used, an acid catalyst, such as hydrochloric or sulfuric acid, is employed to facilitate dehydration of the amine salt to the amide. Use of the alkyl ester, such as the ethyl ester, may result in an interchange reaction to produce the amide.

Details of preparing the active ingredient and typical formulations are given in the following examples which are presented for purposes of illustration and are not intended to limit the scope of the invention.

PREPARATION OF THE ACTIVE INGREDIENT

Preparation I a. 3,5-Dichlorobenzoyl chloride

A suspension of 40 parts of 3,5-dichlorobenzoic acid in 160 parts of thionyl chloride was heated under reflux for 4 hours with solution of the solid occurring. Excess thionyl chloride was removed under reduced pressure and the residue distilled to give 39.6 parts (90 percent yield) of 3,5-dichlorobenzoyl chloride, b.p. 71°–75° C. (1 mm.).

b. N-(1,1-Dimethylpropynyl)-3,5-dichlorobenzamide

The compound was prepared by adding 23.2 parts (0.28 mole) of 3-amino-3-methylbutyne, 40.4 parts of 24.8 percent aqueous sodium hydroxide (0.25 mole) and 125 parts of Esso octane (a commercial product containing 18 percent paraffins, 60 percent naphthenes and 22 percent aromatic hydrocarbons and having a boiling range of 102°–113° C.) to a 500-ml. flask equipped with a stirrer, thermometer and addition funnel.

While stirring and cooling there was added 52.3 parts (0.25 mole) of 3,5-dichlorobenzoyl chloride over a period of 34 minutes at below 20° C. A thick white slurry resulted. The mixture was stirred 3 hours as the thermometer rose to room temperature. The solid was filtered off and washed with 100 parts of 50° C. water. The isolated solid was dried at 0° C. at 20 mm. (Hg) pressure for 14 hours to give 62 parts (95 percent yield) of N-(1,1-dimethylpropynyl)-3,5-dichlorobenzamide as a white solid which melted at 155°–158° C. The solid was found to be 95 percent pure by gas-liquid chromatography. The results of elemental analyses are tabulated below:

|  | Found | Calculated for $C_{12}H_{11}Cl_2NO$ |
|---|---|---|
| % C | 56.84 | 56.3 |
| % H | 4.72 | 4.33 |
| % N | 5.55 | 5.47 |
| % Cl | 27.54 | 27.69 |

Preparation II a. 3,5-Dibromobenzoyl chloride

A suspension of 12 parts of 3,5-dibromobenzoic acid in 70 parts of thionyl chloride was heated under reflux for 3 hours. Excess thionyl chloride was removed under reduced pressure. The product was 3,5-dibromobenzoyl chloride, b.p. 90° C. (0.4 mm.).

b. N-(1,1-Dimethylpropynyl-3,5-dibromobenzamide

A solution of 13.2 parts (0.044 mole) of 3,5-dibromobenzoyl chloride in 28 parts of anhydrous ethyl ether was added dropwise to 3-amino-3-methylbutyne in 140 parts of anhydrous ethyl ether. Stirring was continued for 30 minutes after the addition was complete. The amine hydrochloride byproduct was filtered off and the ether solvent distilled from the reaction vessel. The product recovered was 5.6 parts of N-(1,1-dimethylpropynyl)-3,5-dibromobenzamide which melted at 162°–165° C.

The results of elemental analysis are tabulated:

| | Found | Calculated for $C_{12}H_{11}Br_2NO$ |
|---|---|---|
| % C | 41.22 | 40.80 |
| % H | 3.27 | 3.22 |
| % N | 4.22 | 4.05 |
| % Br | 45.68 | 46.40 |

Preparation III a. 3,5-Dimethylbenzoyl chloride

This compound was prepared by the method of Preparation I by using as the acid 3,5-dimethylbenzoic acid. The product was 3,5-dimethylbenzoyl chloride, b.p. 75° C. (0.2 mm.).

b. N-(1,1-Dimethylpropynyl)-3,5-dimethylbenzamide

By using 3,5-dimethylbenzoyl chloride as the acyl halide in the amidation reaction of Preparation I, a 98 percent yield of N-(1,1-dimethylpropynyl)-3,5-dimethylbenzamide was obtained which melted at 126°–127° C. The results of elemental analysis are tabulated below:

| | Found | Calculated for $C_{14}H_{17}NO$ |
|---|---|---|
| % C | 78.15 | 78.12 |
| % H | 7.68 | 7.97 |
| % N | 6.63 | 6.51 |

Preparation IV a. 3-Chloro-5-methylbenzoyl chloride

Seven parts (0.041 mole) of 3-chloro-5-methylbenzoic acid, available by the method of Klages et al. Berichte, 28, 2045 (1895), was converted to the acid chloride by the method of Preparation I(a). It was purified by extraction with hexane. The product was a quantitative yield of 3-chloro-5-methylbenzoyl chloride. It was shown to be essentially pure by infrared spectroscopy.

b. N-(1,1-Dimethylpropynyl)-3-chloro-5-methylbenzamide

The 3-chloro-5-methylbenzoyl chloride from (a) above was reacted with 3-amino-3-methylbutyne by the method of Preparation II(b). There was obtained a light colored solid which was recrystallized first from aqueous methanol and then from octane. There was obtained 5.6 parts of white solid melting at 110°–112.5° C. The following tabulates the results of an elemental analysis:

| | Found | Calculated for $C_{13}H_{14}ClNO$ |
|---|---|---|
| % C | 66.00 | 66.26 |
| % H | 6.25 | 5.99 |
| % N | 6.09 | 5.94 |
| % Cl | 14.92 | 15.05 |

The product is a 60 percent yield of N-(1,1-dimethylpropynyl)-3-chloro-5-methylbenzamide.

Preparation V a. 3-Bromo-5-methylbenzoyl chloride

Eight parts (0.037 mole) of 3-bromo-5-methylbenzoic acid, available by the method of Jones et al., Journal of the Chemical Society, 1955, 3845, was converted to the acid chloride by the method of preparation I(a). After extraction with hexane there was isolated a quantitative yield of 3-bromo-5-methylbenzoyl chloride. It was shown to be essentially pure by infrared spectroscopy.

b. N-(1,1-Dimethylpropynyl)-3-bromo-5-methylbenzamide

The above 3-bromo-5-methylbenzoyl chloride was reacted with 3-amino-3-methylbutyne by the method of Preparation II(b). The resulting product was recrystallized from aqueous methanol. There was obtained 7.6 parts of white solid melting at 100°–102.5° C. Analysis of the elements gave the following:

| | Found | Calculated for $C_{13}H_{14}BrNO$ |
|---|---|---|
| % C | 56.47 | 55.65 |
| % H | 5.16 | 5.04 |
| % N | 5.38 | 5.00 |
| % Br | 27.33 | 28.50 |

The product is a 73 percent yield of N-(1,1-dimethylpropynyl)-3-bromo-5-methylbenzamide.

Preparation VI a. 3-Bromo-5-chlorobenzoyl chloride

By the method of Preparation I(a) 3-bromo-5-chlorobenzoic acid (prepared by oxidation of 3-bromo-5-chlorotoluene) was converted to the acid chloride. The product was 3-bromo-5-chlorobenzoyl chloride.

b. N-(1,1-Dimethylpropynyl)-3-bromo-5-chlorobenzamide

The above 3-bromo-5-chlorobenzoyl chloride was reacted with 3-amino-3-methylbutyne by the method of Preparation I(b). The resulting white solid was identified as N-(1,1-dimethylpropynyl)-3-bromo-5-chlorobenzamide.

Preparation VII a. 3,5-Difluorobenzoyl chloride

Seven and one-half parts (0.0475 mole) of 3,5-difluorobenzoic acid, available by the method of Roe and Little, Journal of Organic Chemistry 20, 1577 (1955), was converted to the acid chloride by the method of Preparation I(a). It was purified by dissolving in hexane, filtering and stripping off the solvent. The product was an essentially quantitative yield of 3,5-difluorobenzoyl chloride. It was shown to be almost exclusively the acid chloride by infrared examination.

b. N-(1,1-Dimethylpropynyl)-3,5-difluorobenzamide

The 3,5-difluorobenzoyl chloride from (a) above was reacted with 3-amino-3-methylbutyne by the method of Preparation II(b). After recrystallization from hexane there was obtained 6.75 parts of a slightly yellow solid, which melted at 48°–80° C. It was found by analysis to contain 64.45%, C, 4.95% H, 17.10% F and 6.35% N; calculated for $C_{12}H_{11}FNO$ is 64.59% C, 4.97% H, 17.02% F and 6.28% N. The product is a 55 percent yield of N-(1,1-dimethylpropynyl)-3,5-difluorobenzamide.

Preparation VIII a. 3-Chloro-5-fluorobenzoyl chloride

Ten parts (0.057 mole) of 3-chloro-5-fluorobenzoic acid, available by the oxidation of 3-chloro-5-fluorotoluene with aqueous potassium permangate under reflux conditions and melting at 129°–138° C., was converted to the acid chloride by the method of Preparation I(a). The product was purified by extraction with hexane and was shown to be the acid chloride by infrared examination.

b. N-(1,1-Dimethylpropynyl)-3-chloro-5-fluorobenzamide

The 3-chloro-5-fluorobenzoyl chloride from (a) above was reacted with 3-amino-3-methylbutyne by the method of Preparation II(b). After recrystallization from hexane there was obtained 8.4 parts of a slightly yellow solid melting at 83°–85 C. It was found by analysis to contain 60.09% C, 4.51% H, 14.45% Cl, 8.10% F and 5.92% N; calculated for $C_{12}H_{11}ClFNO$ is 60.18% C, 4.63% H, 14.80% Cl, 7.93% F and 5.85% N. The product is a 61 percent yield of N-(1,1-dimethylpropynyl)-3-chloro-5-fluorobenzamide.

EXAMPLE 1

An emulsifiable concentrate of N-(1,1-dimethylpropynyl)-3,5-dichlorobenzamide was made by dissolving 13.5 parts of the aforementioned benzamide in a solution of 3 parts of an emulsifier and the balance to make 100 parts of isophorone-xylene (2:1) solvent. The emulsifier contained dinonylphenoxypolyethoxyethanol containing 20 ethoxy groups, the reaction product of tert-tridecylamine with 35 units of ethylene oxide and 45 units of propylene oxide, and calcium dodecylbenzenesulfonate. This gave an emulsifiable concentrate which contained about 1 pound of active ingredient per gallon.

EXAMPLE 2

An emulsifiable concentrate was prepared by the method of Example 1 by employing 13 percent N-(1,1-dimethylpropynyl)-3,5-dichlorobenzamide, 10 percent emulsifier and 77 percent cyclohexanone.

EXAMPLE 3

In a blender a wettable powder was prepared by adsorbing onto a hydrated silica having an average particle size of 0.02–0.03 microns a mixture of 50 parts of N-(1,1-dimethylpropynyl)-3,5-dichlorobenzamide, 5 parts sodium lignin sulfonate, and 1 part dioctyl sodium sulfosuccinate. The hydrated silica carrier comprised the balance to make 100 parts. The resultant product was micropulverized.

EXAMPLE 4

A wettable powder was prepared by mixing together 75 parts of N-(1,1-dimethylpropynyl)-3,5-dichlorobenzamide, 5 parts sodium lignin sulfonate, 1 part isooctylphenoxypolyethoxyethanol having an average of nine to 10 ethoxy units per molecule and 44 parts of a 1 to 1 mixture of finely divided attapulgite and kaolinite clays.

EXAMPLE 5

When in Examples 1–4 N-(1,1-dimethylpropynyl)-3,5-dibromobenzamide was substituted as the active ingredient, corresponding formulations were obtained.

EXAMPLE 6

The procedures of Examples 1–4 were repeated but using N-(1,1-dimethylpropynyl)-3,5-dimethylbenzamide as the active ingredient. N-(1,1-dimethylpropynyl)-3-chloro-5-methylbenzamide, N-(1,1-dimethylpropynyl)-3-bromo-5-methylbenzamide N-(1,1-dimethylpropynyl)-3,5-difluorobenzamide, and N-(1,1-dimethylpropynyl)-3-chloro-5-fluorobenzamide were similarly used as the active ingredient for the herbicidal formulations in Examples 1–4.

These herbicidal compositions may be applied broadcast to areas to be protected or applied to the environment of a growing crop or crops to be grown, as in a narrow band. Preferably, the compositions are applied prior to the appearance of weeds by incorporation into the soil but desirable results are achieved with surface treatment of the soil prior to emergence of weeds or by treatment after appearance of weeds. If the herbicidal composition is applied by soil incorporation, the composition may be mixed into the ground at a depth of 4 inches or less.

Greenhouse tests on a variety of monocots and dicots have shown superior control of numerous varieties of undesired vegetation and tolerance to certain desirable crops. Table I gives typical herbicidal activity of the following benzamides.

| Composition | |
|---|---|
| A | N-(1,1-dimethylpropynyl)-3,5-dichloro-4-methoxybenzamide |
| B | N-(1,1-dimethylpropynyl)-3,5-dichloro-4-aminobenzamide |
| C | N-(1,1-dimethylpropynyl)-3,5-dichlorobenzamide |
| D | N-(1,1-dimethylpropynyl)-3,5-dibromobenzamide |
| E | N-(1,1-dimethylpropynyl)-3,5dimethylbenzamide |
| F | N-(1,1-dimethylpropynyl)-3,5-difluorobenzamide |
| G | N-(1,1-dimethylpropynyl)-3-chloro-5-fluorobenzamide |
| H | N-(1,1-dimethylpropynyl)-3-chloro-5-methylbenzamide |
| I | N-(1,1-dimethylpropynyl)-3-bromo-5-methylbenzamide |

The preemergence herbicidal data were obtained by spraying acetone solutions without dilution by water at the rate of 4 lbs. per acre of active ingredient. The weeds and crops were observed for injury 14 days after application of the herbicidal composition.

TABLE I

| Composition crop or weed | Percent control | | | | | | | | |
|---|---|---|---|---|---|---|---|---|---|
| | A | B | C | D | E | F | G | H | I |
| Wildoats | 0 | 90 | 100 | 99 | 100 | 100 | 100 | 100 | ---- |
| Johnsongrass | 0 | 100 | 99 | 70 | 80 | 40 | 100 | 80 | 90 |
| Crabgrass | 0 | 0 | 100 | 100 | 99 | 80 | 100 | 100 | 40 |
| Barnyardgrass | 0 | 0 | 100 | 90 | 70 | 60 | 97 | 100 | 50 |
| Wheat | 70 | 20 | 100 | 90 | 70 | 80 | 99 | 70 | 0 |
| Pigweed | 0 | 0 | 90 | 100 | 50 | 60 | 100 | 99 | 50 |
| Cotton | 0 | 0 | 0 | 0 | 0 | 0 | 0 | 0 | 0 |
| Peas | 40 | 0 | 0 | 0 | 0 | ---- | 0 | 0 | 0 |
| Dock | 0 | 90 | 100 | 100 | 100 | 100 | 100 | 100 | 100 |

The selectivity of herbicides embraced by this invention is clearly evident by a perusal of Table I.

Field tests have confirmed the high preemergence activity of the N-(1,1-dimethylpropynyl)-3,5-disubstituted-benzamides of this invention against many grassy and broadleaf weeds and the tolerance of various crops to this herbicide. Cotton, soybeans, cowpeas and safflower have been uninjured by application of 4 lbs. per acre of active ingredient. Alfalfa, lettuce, peas, sorghum, corn and rice have been tolerant to 1–2 lbs. per acre of active ingredient.

Promising results have been obtained with postemergence applications of the compounds of this invention. They have shown particular value for the control of graminaceous weeds. In field tests conducted in established alfalfa, applications of N-(1,1-dimethylpropynyl)-3,5-dichlorbenzamide as low as 1 lb. per acre have given essentially complete control of foxtail (*Hordeum spp.*), annual bluegrass (*Poa annua*) and bromegrass (*Bromus spp.*) and of chickweed (*Stellaria media*) at 3 lbs. per acre 2 to 3 months after treatment. In other field tests essentially complete kills of perennial grasses were obtained with 4 lbs. per acre or less of N-(1,1-dimethylpropynyl)-3,5-dichlorobenzamide.

Generally the active ingredient is applied at the rate of about 0.5 to 10 or more pounds per acre with 1 to 4 pounds per acre being preferred.

In some instances it may be desirable to add one or more other pesticides. Other herbicides which can be incorporated to provide additional advantages and effectiveness include:

Carboxylic Acids and Derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
4-(2,4-dichlorophenoxy)butyric acid and its salts and esters
4-(2-methyl-4-chlorophenoxy)butyric acid and its salts and esters
2,3,6-trichlorophenylacetic acid and its salts
3,6-endoxohexahydrophthalic acid
2,3,5,6-tetrachloroterephthalic acid, dimethyl ester trichloroacetic acid and its salts
2,2-dichloropropionic acid and its salts 2,3-dichlorisobutyric acid and its salts

Carbamic Acid Derivatives

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester
2-chloroallyl N,N-diethyldithiocarbamate
N-methyldithio-carbamic acid salts
ethyl 1-hexamethyleneiminecarbothiolate
N-phenylcarbamic acid, isopropyl ester
N-(m-chlorophenyl)carbamic acid, isopropyl ester
N-(m-chlorophenyl)carbamic acid, 4-chloro-2-butynyl ester
N-(3,4-dichlorophenyl)carbamic acid, methyl ester

Phenols dinitro-o-(sec.-butyl)phenol and its salts
pentachlorophenol and its salts

Substituted Ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-dimethylurea
dichloral urea

Substituted Triazines 2-(chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-2-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine
2-methoxy-4-ethylamino-6-isopropylamino-s-triazine
2-methylmercapto-4-(2-methoxyethylamino)-3-isopropylamino-s-triazine

Diphenyl Ether Derivatives 2,4-dichloro-4'-nitrodiphenyl ether
2,4,6-trichloro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether

Anilides

N-(3,4-dichlorophenyl)propionamide
N-(3,4-dichlorophenyl)methacrylamide
N-(3-chloro-4-methylphenyl)-2-methylpentanamide
N-(3,4-dichlorophenyl)trimethylacetamide
N-(3,4-dichlorophenyl)-α,α-dimethylvaleramide

Uracils 5-bromo-3-s-butyl-6-methyluracil
5-bromo-3-cyclohexyl-1,6-dimethyluracil
3-cyclohexyl-5,6-trimethyleneuracil
5-bromo-3-isopropyl-6-methyluracil
3-tert-butyl-5-chloro-6-methyluracil

Nitriles 2,6-dichlorobenzonitrile
diphenylacetonitrile
3,5-dibromo-4-hydroxybenzonitrile
3,5-diiodo-4-hydroxybenzonitrile

Other Organic Herbicides 2-chloro-N,N-diallylacetamide
N-(1,1-dimethyl-2-propynyl)-3,5-dichlorobenzamide
maleic hydrazide
3-amino-1,2,4-triazole
monosodium acid methanearsonate
disodium methanearsonate
N,N-dimethyl-α,α-diphenylacetamide
N,N-di-(n-propyl)2,6-dinitro-4-trifluoromethylaniline
N,N-di-(n-propyl)2,6-dinitro-4-methylaniline
N,N-di(n-propyl)2,6-dinitro-4-methylsulfonylaniline
O-(2,4-dichlorophenyl)-O-methyl-isopropylphosphoramidothioate
4-amino-3,5,6-trichloropicolinic acid
2,3-dichloro-1,4-naphthaquinone
di(methoxythiocarbonyl)disulfide
6,7-dihydrodipyrido[1,2-a:2',1'-c]pyrazidinium salts
1,1'-dimethyl-4,4'-bipyridinium salts
3,4,5,6-tetrahydro-3,5-dimethyl-2-thio-2H-1,3,5-thiadiazine This invention provides new compounds which are useful for inhibiting or controlling undesirable plant growth in numerous environments.

We claim:

1. A herbicidal composition consisting essentially of (1) an active ingredient having the formula:

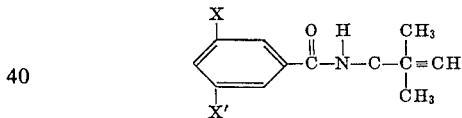

wherein X and X' are selected from Br, Cl, F and CH₃ together with (2) an agronomically acceptable carrier.

2. The composition of claim 1 containing from about 2 to 80 percent of active ingredient.

3. The composition of claim 1 wherein X and X' are chlorine.

4. The composition of claim 1 wherein said carrier is in the form of a suitable liquid.

5. The composition of claim 1 wherein said carrier is in the form of a solid.

6. The composition of claim 1 which additionally contains at least one surface active agent.

7. The composition of claim 6 wherein said carrier is in the form of suitable liquid.

8. The composition of claim 6 wherein said carrier is in the form of a solid.

9. A method for controlling undesirable plant growth comprising applying to the area to be controlled a herbicidally effective amount of the herbicidal composition defined in claim 1.

10. The method of claim 9 wherein the active ingredient of the herbicidal composition is applied at the rate of about 0.5 to 10 lbs. per acre.

11. A method for controlling undesirable plant growth comprising applying to the area to be controlled a herbicidally effective amount of the herbicidal composition defined in claim 3.

* * * * *